United States Patent

Dixon

[15] 3,636,257

[45] Jan. 18, 1972

[54] DIGITAL PULSE IDENTIFICATION SYSTEM

[72] Inventor: Brook Dixon, Selden, N.Y.

[73] Assignee: Acrodyne, Inc., Clifton, N.J.

[22] Filed: June 19, 1969

[21] Appl. No.: 834,719

[52] U.S. Cl. ....................................... 178/66, 178/58, 179/3, 325/30, 343/202

[51] Int. Cl. ....................................................... H04l 27/00

[58] Field of Search ......................... 325/30, 320, 15, 21, 22; 178/66, 88, 66 A, 50, 57, 58, 60, 61; 179/3, 20 P; 343/175, 180, 200, 202

[56] References Cited

UNITED STATES PATENTS 3,121,197 2/1964 Irland .................................. 325/320

3,524,023 8/1970 Whang .................................. 325/30

*Primary Examiner*—Robert L. Griffin
*Assistant Examiner*—Albert J. Mayer
*Attorney*—Edward H. Loveman

[57] ABSTRACT

A frequency shift digital communications system has two band-pass filters for passing mark-space signals in two different channels with means for selectively switching either filter to pass one of the channels from a teletype transmitter or computer readout to a digital discriminator or computer write-in. The discriminator employs a multivibrator provided with timing circuits which are selectively activated to change the pulse length issuing from the multivibrator by switching means coordinated with switching of the filters.

5 Claims, 5 Drawing Figures

FIG. 1

INVENTOR.
BROOK DIXON

BY Edward H. Loveman

ATTORNEY

INVENTOR
BROOK DIXON
BY
Edward H Loveman
ATTORNEY

DIGITAL PULSE IDENTIFICATION SYSTEM

The present invention concerns a portable computer terminal using digital code over conventional telephone channel such as disclosed in U.S. Pat. application No. 620,760 filed Mar. 6, 1967 and issued as U.S. Pat. No. 3,505,474 on Apr. 7, 1970, and more specifically concerns improved circuitry for identifying mark and space pulses in a frequency shift digital communications system, and more particularly involves a novel digital discriminator circuit employed in such a system.

Conventionally mark and space pulses are transmitted at two different frequencies in a frequency shift system. For example, mark and space signals are transmitted at 1,270 and 1,070 Hz. respectively by equipment originating a message or call transmitted to a called terminal. Answering equipment at the called terminal transmits mark and space signals at two other frequencies, for example 2,225 and 2,025 Hz. respectively. Since the called or answering station may at a different time be the call originate station, equipment heretofore used to distinguish and identify the several frequencies has involved costly analog circuits requiring much time, labor and expense to set up and maintain. The present invention is directed at simpler, less expensive, smaller digital equipment, capable of handling greater bandwidths or bit widths than prior systems.

According to the invention, a simplex or duplex dual channel frequency shift communication system is provided with two filters for passing the respective channels and means for switching the filters to permit either filter to be used at any one station. The filters can be switched at their inputs between a telephone receiver and a teletype transmitter and the outputs of the filters can be switched between a telephone microphone and a digital discriminator driving a teletype receiver. The microphone and receiver of the telephone can be coupled to a computer. The digital discriminator includes a monostable or one-shot multivibrator provided with a plurality of timing circuits and with switching means for the timing circuits coordinated with switching means of the filters.

It is, therefore, one object of the invention to provide a dual channel frequency shift communications system with a novel digital discriminator circuit.

A further object of the invention is to provide a digital discriminator circuit with a multivibrator having high- and low-frequency timing circuits and means for selectively switching between the two timing circuits.

Another object of the invention is to provide a dual channel frequency shift communications system with means for switching between high- and low-frequency channel filters, said switching being coordinated with means for switching between two timing circuits.

These and other objects and many of the attendant advantages of this invention will be readily appreciated as the same becomes better understood by reference to the following detailed description when considered in connection with the accompanying drawings, wherein FIG. 1 is a diagram of a dual channel frequency shift communications system embodying the invention.

Figure 1:
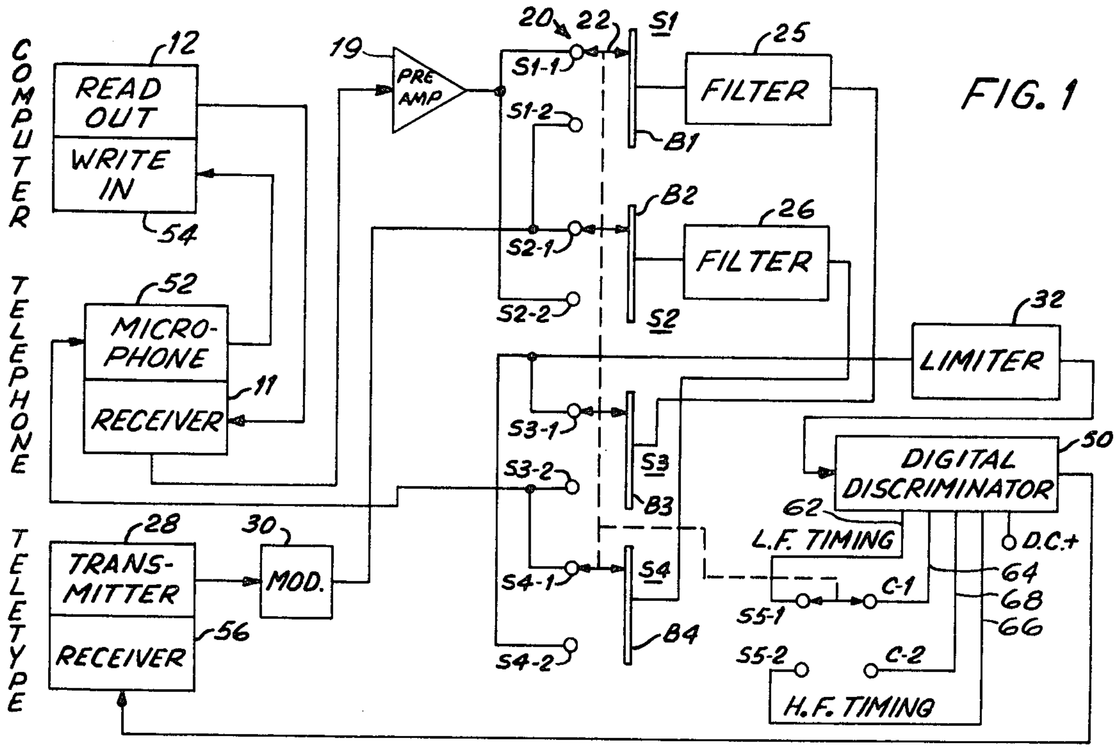

Referring now to the drawings, wherein like reference numerals designate like parts throughout the figures thereof, there is shown in FIG. 1 a communications system 10 in which a telephone receiver 11 is connected to a suitable source of square pulses such as the readout of a computer 12. The microphone output is connected via a preamplifier 19 to a gang switch 20. The switch may have five sections S1–S5, each provided with a slider 22. The sliders are coupled together mechanically. One end of each slider, in four sections S1–S4, rides along one of bars B1–B4, and in the fifth section S5 the slider contacts fixed contacts C1–C2 in turn. The other end of each slider contacts successive ones of eight fixed contacts 24 in the respective switch sections.

Low- and high-frequency band-pass filters 25, 26 have their inputs connected to switch bars B1, B2 and their outputs connected to switch bars B3, B4. Preamplifier 19 is connected to contact S1–1 in section S1 and to contact S2–2 in section S2. A teletype signal transmitter 28 is connected via modulator 30 to contact S1–2 in section S1 and to contact S2–1 in section S2. A limiter circuit 32 has its input connected to switch contacts S3–1, and S4–2 in sections S3 and S4, respectively. The limiter's output is connected to a digital discriminator 50.

Figure 2:
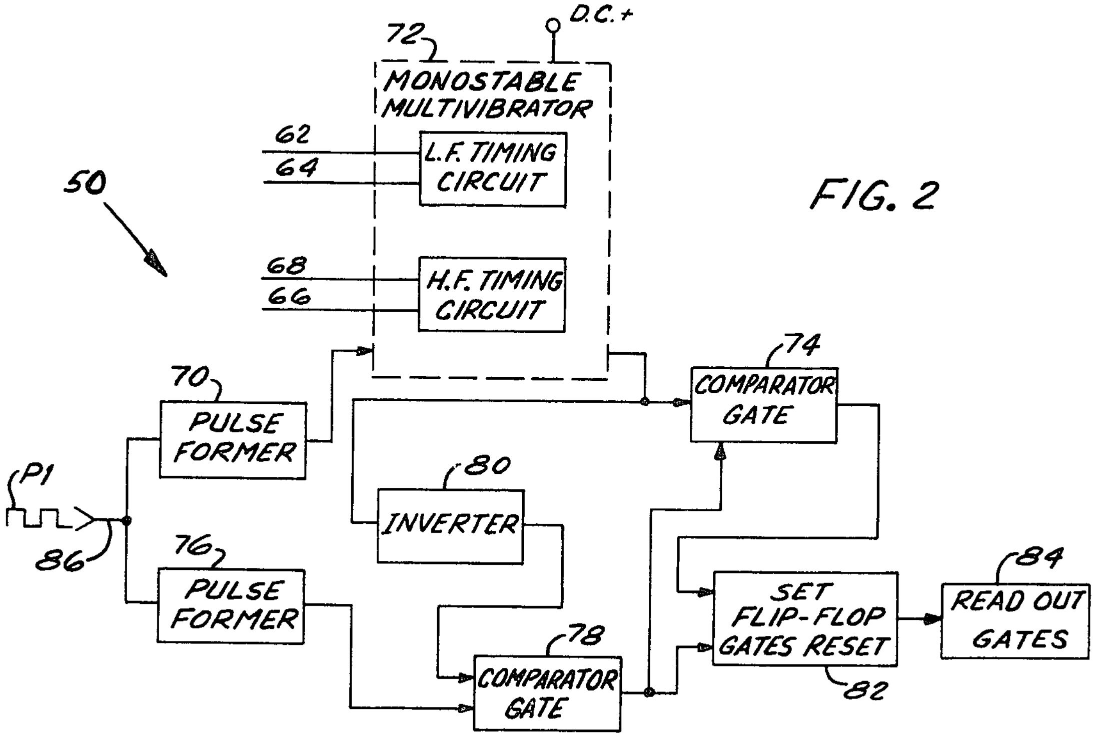
FIG. 2 is a diagram of a digital discriminator employed in the system of FIG. 1.
Figure 3:
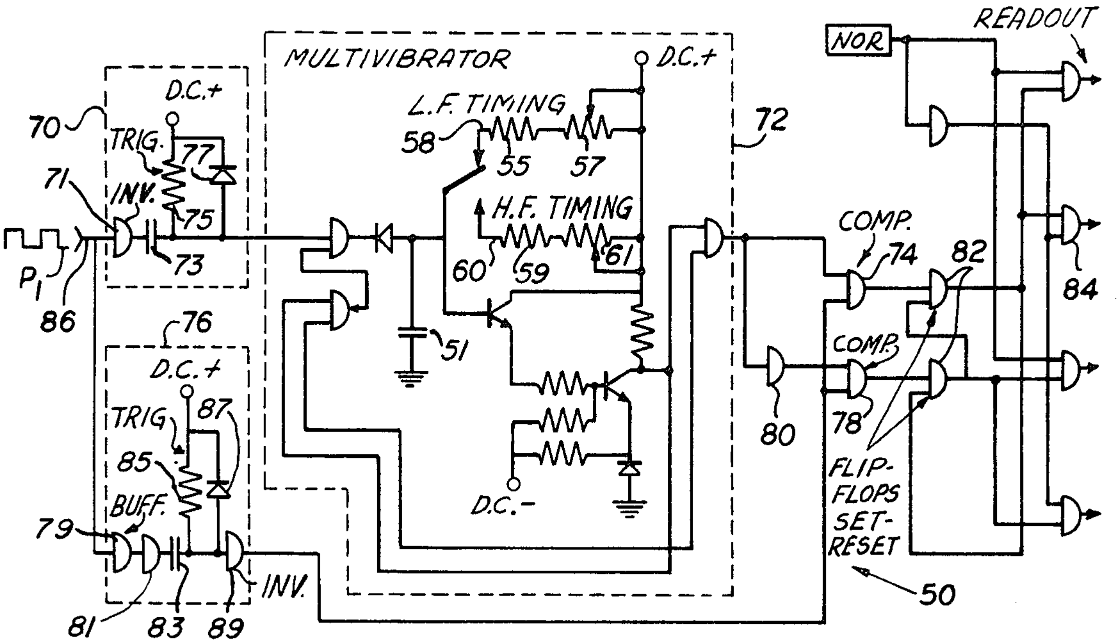
FIG. 3 is a more detailed diagram of the digital discriminator of FIG. 2.

Telephone microphone 52 which drives a computer write-in circuit 54, is connected to switch contacts S3–2 and S4–1. The output of the digital discriminator is connected to teletype-receiving circuit 56. Low- and high-frequency timing circuits 58, 60 in the discriminator 50 as shown in FIGS. 2 and 3 are connected to switch section S5 in such a way that switching of the circuits is coordinated with switching of the filters 25, 26. Line 62 from the low-frequency timing circuit is connected to switch contacts S5–1, and the return line 64 is connected to contacts C1. Line 66 from the high-frequency timing circuit is connected to switch contacts S5–2 and the return line 68 is connected to contact C2.

In operation of system 10, the computer readout 12 can be connected to low-frequency filter 25 input at the first switching position, while the filter output will be connected to limiter 32. In this first position, the teletype transmitter will be connected to the input of high-frequency filter 26, while the filter output will be connected to the computer write-in 54. In the second switching position, the computer readout will be connected to the input of the high-frequency filter while this filter's output will be connected to limiter 32. In this second position, the teletype transmitter will be connected to the input of low-frequency filter 25 while the filter output will be connected to the computer write-in 54.

Switching of the low- and high-frequency timing circuits is accomplished simultaneously and in coordination with switching of the filters. In the first switching position, when low-frequency filter 25 is connected to the computer readout, the low-frequency timing circuit 58 (FIG. 3) comprised of a pair of resistors 55, 57 and a capacitor 51 is activated at the discriminator. At the second switching position, when high-frequency filter 26 is connected to the computer readout, the high-frequency timing circuit 60 (FIG. 3) comprised of a pair of resistors 59, 61 and the capacitor 51 is activated at the discriminator.

The circuitry and operation of the discriminator 50 will now be explained with particular reference to FIGS. 2, 3 and 4. Referring first to FIG. 2 and FIG. 3, one pulse former 70 of an invertor 71, a capacitor 73, a resistor 75 and a diode 77 is connected to a monostable or one-shot multivibrator 72. The multivibrator is connected to one comparator gate 74. A second pulse former 76 comprised of a buffer 79, an invertor 81, a capacitor 83, a resistor 85, a diode 87 and an invertor 89 is connected to both the first comparator gate 74 and a second comparator gate 78. A pulse inverter 80 is connected from the multivibrator to comparator gate 78. The gate outputs are connected to set and reset flip-flop gates 82 and these in turn are connected to pulse readout gates 84. The pulse formers have a common input 86. The low- and high-frequency circuits 58 and 60 are connected to the multivibrator to control the lengths of pulses produced at low and high frequencies depending on the setting of switch section S5 forming part of switch 20.

Figure 4:
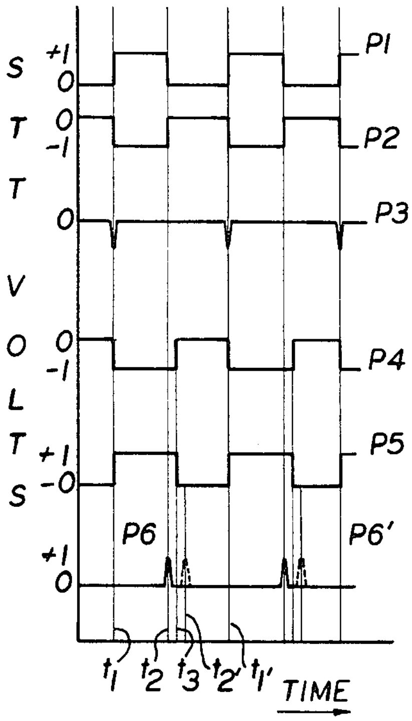
FIG. 4 and FIG. 5 are diagrams of pulse waveforms employed in explaining the mode of operation of the digital discriminator.
Figure 5:
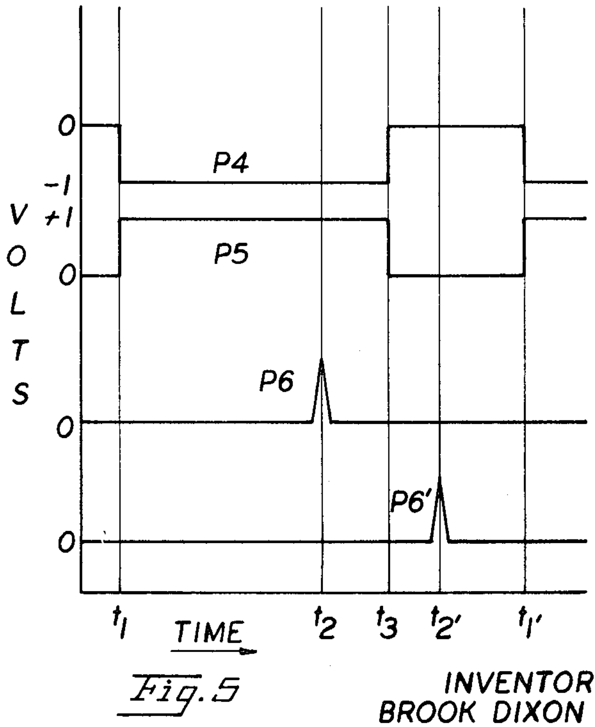

Square wave mark and space pulses P1 indicated in FIGS. 2, 3 and 4 is applied at input 86. In pulse former 70 the leading edge of each of the pulses P1 are inverted and driven by the invertor 71 to form pulses P2 which are converted by the RC network comprised of the capacitor 73 and the resistor 75 to inverted trigger pulses P3. Pulses P3 are generated at times $t_1$ the start of each pulse P1. The diode 77 chops off the trailing edge portion of the pulses P1. Pulses P3 are applied to the multivibrator 72 to trigger it to produce one-shot square pulses P4. Pulses P4 are applied to comparator gate 74. They are also inverted by inverter 80 to produce pulses P5 which are applied to the other comparator gate 78. In the pulse former 76 each of the trailing edges of the pulses P1 is inverted by the buffer 79 and the inverter 81, capacitor 83 and resistor 85 function in the same fashion as corresponding components in the pulse former 70. The inverter 89 inverts the trigger pulse formed by the RC network (resistor 81 and capacitor 83) and thereby generates trigger pulses P6. These occur at time $t_2$ the end of each pulse P1. Pulses P6 are applied to both comparator gates 74 and 78. The time $t_2$ of occurrence of trigger pulses P6 is compared with the pulses P4 and P5. If a trigger pulse occurs during the time $t_1$ to $t_3$ of a multivibrator pulse P4, this indicates one frequency, for example a mark frequency and the flip-flop gates 82 are set by the comparators so that readout gates 84 read out a mark level. If the trigger pulse P6 occurs at time $t_2'$ subsequent to time $t_3$ or between times $t_3$–$t_1'$ when the multivibrator pulse is off, as indicated by pulses P6′, this indicates a space frequency and the gates 84 read out a space from flip-flop gates 82; see FIG. 5. Thus the length of the multivibrator pulse with respect to the time of occurrence of the trigger pulse P6 or P6′ determines whether the input to the discriminator is a mark or space, and the output of the discriminator applied to teletype receiver 56 in system 10 records mar or space signals accordingly for whichever channel is switched into the system via filters 25 and 26. The indication of mark and space signals depend on whether pulse P6 occurs before or after time $t_3$ but this sequence is entirely arbitrary, for if desired, the reverse may be indicated, i.e., space and mark if the pulse P6 occurs before or after time $t_3$ respectively.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A frequency shift digital communications system comprising,
  - a first and a second source of frequency shifted mark-space signal pulses, said sources adapted to produce said signal pulses in one of two channels, one channel passing a high- and low-frequency pulses different than the high- and low-frequency pulses passing through the second channel;
  - a pair of band-pass filters for passing said signal pulses in the respective channels;
  - a switch means connected between the pulse sources and said filters for coupling each of said filters to a selected one of said channels; and
  - a digital discriminator adapted to be connected in circuit with one of said filters via said switch means to identify each signal pulse passed by one of said filters as a mark or a space pulse.

2. A frequency shift digital communications system as defined by claim 1, wherein said discriminator comprises,
  - a pulse generator adapted to be activated by said signal pulse to produce a single predetermined square pulse of fixed length;
  - a pulse-forming means adapted to generate trigger pulses at the end of each of said signal pulses; and
  - comparing means for determining times of occurrence of said trigger pulses with respect to said pulses of fixed length thereby to identify each signal pulse as a mark or a space pulse.

3. A frequency shift digital communications system as defined by claim 2, further comprising a pair of timing circuits adapted to be selectively connected in circuit with said pulse generator and thereby determine the length of pulses generated by said pulse generator.

4. A frequency shift digital communications system as defined by claim 3, further comprising a contact means interconnecting said timing circuits of said pulse generator and said switch means whereby said timing circuits are selectively connected to said pulse generator in coordination with the particular band-pass filter selectively switched into circuit with said digital discriminator.

5. A frequency shift digital communication system as defined by claim 2 wherein said comparing means comprises,
  - a pair of comparator gates each connected in circuit with said pulse generator to receive square pulses therefrom in upright and inverted form respectively;
  - a means for applying said trigger pulses to both of said comparator gates; and
  - a bistable means connected to the outputs of said comparator gates whereby said bistable means will assume one configuration when a mark pulse is identified and another configuration when a space pulse is identified.

* * * * *